United States Patent
Tsuchihashi

(10) Patent No.: US 12,269,956 B2
(45) Date of Patent: Apr. 8, 2025

(54) INKJET INK

(71) Applicant: KYOCERA Document Solutions Inc., Osaka (JP)

(72) Inventor: Kazuki Tsuchihashi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 538 days.

(21) Appl. No.: 17/656,514

(22) Filed: Mar. 25, 2022

(65) Prior Publication Data

US 2022/0306882 A1    Sep. 29, 2022

(30) Foreign Application Priority Data

Mar. 29, 2021   (JP) .............................. 2021-055227

(51) Int. Cl.
| | |
|---|---|
| C09D 11/328 | (2014.01) |
| C09D 11/033 | (2014.01) |
| C09D 11/037 | (2014.01) |
| C09D 11/104 | (2014.01) |
| C09D 11/107 | (2014.01) |
| D06P 1/52 | (2006.01) |
| D06P 3/52 | (2006.01) |
| D06P 5/30 | (2006.01) |

(52) U.S. Cl.
CPC .......... *C09D 11/328* (2013.01); *C09D 11/033* (2013.01); *C09D 11/037* (2013.01); *C09D 11/104* (2013.01); *C09D 11/107* (2013.01); *D06P 3/526* (2013.01); *D06P 5/30* (2013.01); *D06P 1/5257* (2013.01); *D06P 1/5271* (2013.01); *D06P 1/5285* (2013.01)

(58) Field of Classification Search
None
See application file for complete search history.

(56) References Cited

U.S. PATENT DOCUMENTS

| | | | |
|---|---|---|---|
| 4,664,708 A | 5/1987 | Allen | |
| 5,621,022 A * | 4/1997 | Jaeger | .................. B41M 5/0256 106/31.47 |
| 2017/0226361 A1* | 8/2017 | Lu | ........................ C09D 11/326 |

FOREIGN PATENT DOCUMENTS

JP    S62-119279 A    5/1987

OTHER PUBLICATIONS

"Specific, Adj. & N." Oxford English Dictionary, Oxford UP, Jul. 2023. Retrieved on Oct. 25, 2024. (Year: 2024).*

* cited by examiner

*Primary Examiner* — Richard A. Huhn
(74) *Attorney, Agent, or Firm* — Studebaker Brackett PLLC

(57) ABSTRACT

An inkjet ink contains coloring particles and an aqueous medium. The coloring particles contain a reaction product between a reactive dye and a specific resin having a primary hydroxyl group. The reactive dye may have a chlorotriazinyl group. The specific resin may include a styrene-(meth)acrylic resin, a polyester resin, or a urethane resin.

14 Claims, No Drawings

INKJET INK

INCORPORATION BY REFERENCE

The present application claims priority under 35 U.S.C. § 119 to Japanese Patent Application No. 2021-55227, filed on Mar. 29, 2021. The contents of this application are incorporated herein by reference in their entirety.

BACKGROUND

The present disclosure relates to an inkjet ink.

An inkjet ink is required to enable formation of images with desired image density. Textile printing (inkjet textile printing) using an inkjet ink gathers attention in recent years. The inkjet ink used in inkjet textile printing is required to enable formation of a textile print with excellent color fastness to washing. As an inkjet ink that can enable formation of a textile print with excellent color fastness to washing, an inkjet ink is proposed that contains a polymer dye of a reaction product between polyethylenimine and a reactive dye.

SUMMARY

An inkjet ink according to an aspect of the present disclosure contains coloring particles and an aqueous medium. The coloring particles contain a reaction product between a reactive dye and a specific resin having a primary hydroxyl group.

DETAILED DESCRIPTION

The following describes an embodiment of the present disclosure. In the present specification, the term "(meth)acryl" is used as a generic term for both acryl and methacryl. Any one of each component described in the present specification may be used independently, or two or more of the component may be used in combination.

In the following, measurement values for volume median diameter ($D_{50}$) are values as measured using a dynamic light scattering type particle size distribution analyzer ("ZETA-SIZER NANO ZS", product of Malvern Instruments Ltd.) unless otherwise stated.

In the following, measurement values for hydroxyl value are values as measured in accordance with the method defined in the Japanese Industrial Standards (JIS) K0070-1992 unless otherwise stated.

<Inkjet Ink>

An inkjet ink (also referred to below as an ink) according to an embodiment of the present disclosure contains coloring particles and an aqueous medium. The coloring particles contain a reaction product between a reactive dye and a specific resin having a primary hydroxyl group.

The ink of the present disclosure is suitable as an ink used for textile-printing a textile printing target. The textile printing target to be printed with the ink of the present disclosure may be a woven fabric or a knitted fabric. Examples of the textile printing target include a cotton fabric, a silk fabric, a hemp fabric, an acetate fabric, a rayon fabric, a nylon fabric, a urethane fabric, and a polyester fabric. The textile printing target is preferably a polyester fabric.

A direct textile printing method (textile printing method in which an ink is directly ejected toward a textile printing target) will be described as an example of a textile printing method using the ink of the present disclosure. The direct textile printing method includes a process of forming an image by ejecting the ink of the present disclosure toward an image formation area of a textile printing target. In ejecting the ink of the present disclosure, an inkjet textile printing apparatus including a recording head (e.g., a thermal recording head or a piezoelectric recording head) can be used. Preferably, the direct textile printing method further includes a process of heating the textile printing target after image formation. Examples of conditions for heating the textile printing target include a heating temperature of 150° C. or higher and 220° C. or lower and a heating time of 30 seconds or longer and 120 seconds or shorter.

However, the ink of the present disclosure may be used for a purpose other than textile printing. For example, the ink of the present disclosure may be used as an ink for recording on a recording medium such as printing paper.

As a result of the ink of the present disclosure having the above features, images with desired image density can be formed with the ink and a textile print with excellent color fastness to washing can be formed with the ink. Presumably, the reasons therefor are as follows. The ink of the present disclosure contains coloring particles containing the reaction product between the reactive dye and the specific resin having the primary hydroxyl group. The coloring particles are less soluble in water than the reactive dye. Therefore, the coloring particles will not be eluted out into washing liquid even when a textile print formed with the ink of the present disclosure is washed. As such, the textile print formed with the ink of the present disclosure is excellent in color fastness to washing. Furthermore, a portion of the molecules of the reactive dye that contributes to coloring is hard to change in chemical structure in the reaction between the reactive dye and the specific resin having a primary hydroxyl group. Therefore, the coloring particles have excellent color formability derived from the reactive dye. When the ink of the present disclosure containing coloring particles such as above is used, images with desired image density can be formed.

[Coloring Particles]

The coloring particles contain the reaction product between the reactive dye and the specific resin having the primary hydroxyl group. The coloring particles preferably contains only the reaction product, but may additionally contain another component (e.g., an unreacted reactive dye, an unreacted specific resin, a resin other than the specific resin, and a colorant other than the reactive dye). The percentage content of the reaction product in the coloring particles is preferably at least 70% by mass, more preferably at least 90% by mass, and further preferably 100% by mass.

The coloring particles have a volume median diameter $D_{50}$ of preferably at least 40 nm and no greater than 150 nm, and further preferably at least 80 nm and no greater than 120 nm. As a result of the volume median diameter $D_{50}$ of the coloring particles being set to at least 40 nm, agglomeration of the coloring particles can be inhibited. As a result of the volume median diameter $D_{50}$ of the coloring particles being set to no greater than 150 nm, performance of the ink of the present disclosure being ejected can be increased.

The content of a component derived from the reactive dye in the coloring particles is preferably at least 10 parts by mass and no greater than 90 parts by mass relative to 100 parts by mass of a component derived from the specific resin, and more preferably at least 25 parts by mass and no greater than 50 parts by mass. As a result of the content of the component derived from the reactive dye being set to at least 10 parts by mass, formation of images with desired image density with the ink of the present disclosure can be further facilitated. As a result of the content of the component derived from the reactive dye being set to no greater than 90 parts by mass, color fastness to washing of a textile print formed with the ink of the present disclosure can be further increased.

The percentage content of the coloring particles in the ink of the present disclosure is preferably at least 3.0% by mass and no greater than 25.0% by mass, and more preferably at least 10.0% by mass and no greater than 20.0% by mass.

(Reactive Dye)

A reactive dye is typically used in textile printing of a textile printing target (e.g., cotton fabric) containing cellulose fibers. Examples of the color of the reactive dye include a black color, a yellow color, a magenta color, and a cyan color. Examples of the reactive dye include a substitution dye that causes a substitution reaction and an addition reactive dye that causes an addition reaction. Examples of the substitution dye include a reactive dye (chlorotriazine-based reactive dye) having a chlorotriazinyl group (e.g., a monochlorotriazinyl group or a dichlorotrizyanyl group). Examples of the addition reactive dye include a reactive dye (vinylsulfone-based reactive dye) having a vinylsulfonyl group. The reactive dye is preferably a reactive dye having a chlorotriazinyl group.

Examples of the substitution reactive dye include "Kayacion A Series" (e.g., Yellow A-3R, violet A-3R, and Blue A-B) and "Kayacion P Series" (e.g., Yellow P-5G, Yellow P-4G, Yellow P-N3R, Orange P-G, Brown P-N4R, Brown P-BDN, Scarlet P-RN, Scarlet P-NA, Red P-2B, Red P-4BN, Blue P-3R, Blue P-NFB 150, Turquoise P-3GF, Navy P-N2R, Black P-NBR, Black P-N, and Black P-GS) produced by Nippon Kayaku Co., Ltd.

Other examples of the substitution reactive dye include "SUMIFIX (registered Japanese trademark) Supra Series" (e.g., Brill. Yellow 3GF 150% gran., Yellow 3RF 150% gran., Yellow E-XF gran., Scarlet 2GF 150% gran., Brill. Red GFC 150%, Brill. Red BSF 150% gran., Brill. Red 3BF 150% gran., Red E-XF gran., Red LF-3B, Red 4BNF 150% gran., Rubine E-XF gran., Blue BRF 150% gran., Blue E-XF gran., Turq. Blue BGF(N), Yellow Brown E-XF gran., Navy Blue BF gran., Navy Blue 3GF 150% gran., and Navy Blue GNF gran.) produced by SUMITOMO CHEMICAL COMPANY, LIMITED.

Still other examples of the substitution reactive dye include "Drimarene K Series" (e.g., Yellow 3GL, Golden Yellow 2RL, Orange 2R, scarlet, Red BG, Red 4B, Red 8B, Rubinole 5B, Brilliant Blue 2R, Brilliant Blue BL, Violet 2R, Turquoise 2G, Navy GRL, Brown 2R, Brilliant Green 5BL, Brilliant Green GL, Black B, Black 2B, and Jet Black) produced by Clariant Japan K.K.

Still other examples of the substitution reactive dye include "Drimarene Series" (e.g., K Brilliant Blue BL, K Scarlet, K Yellow 3GL, and K Jet Black) produced by Sigma-Aldrich Corporation.

Examples of the addition reactive dye include "SUMIFIX (registered Japanese trademark) Series" (e.g., Yellow 2GL (A) conc., Yellow GR 150%, Golden Yellow GG (A) 150%, Brill. Orange 3R 135%, Brill. Red G special, Red B 150%, Brill. Red BB 150%, Brill. Blue R special gran., Brill. Blue R 150% gran., Blue KP liquid, Turq. Blue G(N) conc., Black B 150%, Black EX conc., and Black E-XF) produced by SUMITOMO CHEMICAL COMPANY, LIMITED.

Other examples of the addition reactive dye include "REMAZOL (registered Japanese trademark) Series (e.g., Yellow GG 150%, B. Yellow GL 150%, Yellow R, B. Orange G New, B. Orange 3R, Scarlet GR, B. Red GG, Red B, B. Red F3B, Bordeaux B, B. Violet 5R, Violet B new, P. Navy Blue RR, Navy Blue RGB, B. Blue RN, B. Blue BB, Turquoise Blue G, Green B New, Green GDL New, Brown GR New, P. Brown 2R, Gray G, Black AN, Black B New, and Black DEN) produced by DYSTAR JAPAN LTD.

(Specific Resin)

The specific resin has a primary hydroxyl group. The primary hydroxyl group is a hydroxyl group included in a monovalent group represented by —$CH_2OH$, for example. No particular limitations are placed on the specific resin so long as the specific resin has a primary hydroxyl group, and examples of the specific resin include (meth)acrylic resins, styrene resins, styrene-(meth)acrylic resins, polyester resins, urethane resins, acrylonitrile resins, and acrylamide resins. The specific resin is preferably a styrene-(meth)acrylic resin, a polyester resin, or a urethane resin.

The specific resin has a hydroxyl value of preferably at least 20 mgKOH/g and no greater than 120 mgKOH/g, and more preferably at least 30 mgKOH/g and no greater than 70 mgKOH/g. As a result of the specific resin having a hydroxyl value of at least 20 mgKOH/g, the specific resin tends to readily react with the reactive dye. As a result of the specific resin having a hydroxyl value of no greater than 120 mgKOH/g, the ink of the present disclosure can have increased preservation stability.

(Styrene-(meth)acrylic Resin)

The styrene-(meth)acrylic resin includes a styrene unit and a repeating unit derived from a (meth)acrylic acid compound. Examples of the (meth)acrylic acid compound include (meth)acrylic acid, (meth)acrylic acid alkyl ester, and (meth)acrylic acid hydroxyalkyl ester.

Preferably, the percentage content of the styrene unit relative to all the repeating units in the styrene-(meth)acrylic resin is at least 3% by mass and no greater than 15% by mass.

Preferably, the percentage content of the repeating unit derived from (meth)acrylic acid relative to all the repeating units in the styrene-(meth)acrylic resin is at least 3% by mass and no greater than 15% by mass.

Examples of the (meth)acrylic acid alkyl ester include methyl (meth)acrylate, ethyl (meth)acrylate, n-propyl (meth)acrylate, iso-propyl (meth)acrylate, n-butyl (meth)acrylate, iso-butyl (meth)acrylate, t-butyl (meth)acrylate, 2-ethylhexyl (meth)acrylate, and lauryl (meth)acrylate.

The percentage content of the repeating unit derived from alkyl ester (meth)acrylate relative to all the repeating unit in the styrene-(meth)acrylic resin is preferably at least 55% by mass and no greater than 75% by mass.

Examples of the (meth)acrylic acid hydroxyalkyl ester include 2-hydroxyethyl (meth)acrylate, 3-hydroxypropyl (meth)acrylate, 2-hydroxypropyl (meth)acrylate, and 4-hydroxybutyl (meth)acrylate.

Preferably, the percentage content of the repeating unit derived from (meth)acrylic acid hydroxyalkyl ester relative to all the repeating units in the styrene-(meth)acrylic resin is at least 7% by mass and no greater than 20% by mass.

The styrene-(meth)acrylic resin has a primary hydroxyl group at a side chain or an end thereof. The styrene-(meth)acrylic resin is preferably a styrene-(meth)acrylic resin that has a primary hydroxyl group at a side chain thereof and that does not have a primary hydroxyl group at an end thereof. A styrene-(meth)acrylic resin such as above can be obtained by copolymerization between monomers including styrene and (meth)acrylic acid hydroxyalkyl ester.

A combination of monomers that are raw materials of the styrene-(meth)acrylic resin is preferably Combinations A below, and more preferably Combination A-1.

Combination A: styrene, (meth)acrylic acid, (meth)acrylic acid alkyl ester, and (meth)acrylic acid hydroxyalkyl ester Combination A-1: styrene, methacrylic acid, methyl methacrylate, 2-ethylhexyl methacrylate, and 2-hydroxyethyl methacrylate (Polyester Resin)

The polyester resin is obtained by condensation polymerization between at least one polyhydric alcohol and at least one polybasic carboxylic acid. Examples of the polyhydric alcohol for synthesis of the polyester resin include dihydric alcohols (e.g., diol compounds and bisphenol compounds) and tri- or higher-hydric alcohols. Examples of the polybasic carboxylic acid for synthesis of the polyester resin include dibasic carboxylic acids and tri- or higher-basic carboxylic acids. Note that a polybasic carboxylic acid derivative (e.g., an anhydride of a polybasic carboxylic acid or a halide of a polybasic carboxylic acid) that can form an ester bond through condensation polymerization may be used instead of the polybasic carboxylic acid.

Examples of the diol compounds include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compounds include bisphenol A, hydrogenated bisphenol A, bisphenol A-ethylene oxide adduct (e.g., polyoxyethylene(2,2)-2,2-bis(4-hydroxyphenyl)propane), and bisphenol A-propyleneoxide adduct.

Examples of the tri- or higher-hydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, digylcerol, 2-methylpropanethiol, 2-methyl-1,2,4-butanetriol, trimethylolethane, trimethylolpropane, and 1,3,5-trihydroxymethylbenzene.

Examples of the dibasic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, alkyl succinic acids (specific examples include n-butylsuccinic acid, isobutylsuccinic acid, n-octylsuccinic acid, n-dodecylsuccinic acid, and isododecylsuccinic acid), and alkenyl succinic acids (specific examples include n-butenylsuccinic acid, isobutenylsuccinic acid, n-octenylsuccinic acid, n-dodecenylsuccinic acid, and isododecenylsuccinic acid).

Examples of the tri- or higher-basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid.

The polyester resin has a primary hydroxyl group at a side chain or an end thereof, for example. Preferably, the polyester resin has a primary hydroxyl group at an end thereof and does not have a primary hydroxyl group at a side chain thereof. A polyester resin such as above can be obtained by condensation polymerization between a diol compound and a polybasic carboxylic acid. Therefore, the polyester resin is preferably a condensation polymer of a diol compound and a polybasic carboxylic acid, and more preferably a condensation polymer of sebacic acid, adipic acid, and 1,4-butanediol.

The hydroxyl value of the polyester resin tends to increase as the mass average molecular weight (Mw) thereof is decreased. The polyester resin has a mass average molecular weight (Mw) of preferably at least 3000 and no greater than 30,000, and more preferably at least 7000 and no greater than 12,000. As a result of the mass average molecular weight (Mw) of the polyester resin being set to at least 3000 and no greater than 30,000, the hydroxyl value of the polyester resin can be adjusted within an appropriate range.

(Urethane Resin)

The urethane resin is a copolymer of a diol compound and a polyisocyanate, for example. Examples of the diol compound for synthesis of the urethane resin include the same compounds as those listed as the examples of the diol compound for the polyester resin. The diol compound for synthesis of the urethane resin is preferably 1,4-butanediol or 1,6-hexanediol.

An example of the polyisocyanate is diisocyanate. Examples of the diisocyanate include an aliphatic diisocyanate, an alicyclic diisocyanate, and an aromatic diisocyanate.

Examples of the aliphatic diisocyanate include ethylene diisocyanate, 2,2,4-trimethylhexamethylene diisocyanate, and 1,6-hexamethylene diisocyanate.

Examples of the alicyclic diisocyanate include hydrogenated 4,4'-diphenylmethan diisocyanate, 1,4-cyclohexane diisocyanate, methylcyclohexylene diisocyanate, isophorone diisocyanate, and norbornane diisocyanate.

Examples of the aromatic diisocyanate include 4,4'-diphenylmethane diisocyanate, xylylene diisocyanate, toluene diisocyanate, and naphthalene diisocyanate.

The urethane resin is preferably a copolymer of a diol compound and an aliphatic diisocyanate, and more preferably a copolymer of 1,4-butanediol, 1,6-hexanediol, and 1,6-hexamethylene diisocyanate.

(Coloring Particle Preparation Method)

An example of a coloring particle preparation method includes a first process of causing a reaction between the reactive dye and the specific resin in an organic solvent and a second process of performing phase inversion emulsification to make a reaction product between the reactive dye and the specific resin obtained in the first process particles.

(First Process)

In the present process, a reaction between the reactive dye and the specific resin is caused in an organic solvent. The organic solvent is dimethyl sulfoxide, for example. In the reaction, the amount of the reactive dye used is preferably at least 10 parts by mass and no greater than 90 parts by mass relative to 100 parts by mass of the specific resin, and more preferably at least 25 parts by mass and no greater than 50 parts by mass. Preferably, the reaction temperature is 70° C. or higher and 130° C. or lower. Preferably, the reaction time is 30 minutes or longer and 120 minutes or shorter. In the reaction, a base (e.g., triethanolamine) may be added to adjust the pH of a reaction liquid to at least 8 and no greater than 12.

(Second Process)

In the present process, phase inversion emulsification is performed to make the reaction product between the reactive dye and the specific resin particles. Specifically, the reaction product is mixed while being dissolved in an organic solvent (e.g., methyl ethyl ketone) in phase inversion emulsification. Next, water is added to the resultant mixed liquid to precipitate coloring particles containing the reaction product. Next, the organic solvent is distilled from a dispersion containing the coloring particles, water, and the organic solvent to obtain a coloring particle dispersion containing the coloring particles and water.

Note that other examples of the coloring particle formation method include a method in which the above-described reaction product is kneaded and pulverized and a method in which the reactive dye is dissolved in a solution containing a monomer of the specific resin and the monomer is polymerized.

[Aqueous Medium]

The aqueous medium contained in the ink of the present disclosure is a medium containing water. The aqueous medium may function as a solvent or a dispersion medium. Specific examples of the aqueous medium include an aqueous medium containing only water and an aqueous medium containing water and a water-soluble organic solvent.

(Water)

The percentage content of the water in the ink of the present disclosure is preferably at least 30.0% by mass and no greater than 90.0% by mass, and more preferably at least 50.0% by mass and no greater than 80.0% by mass. As a result of the percentage content of the water being set to at least 30.0% by mass and no greater than 90.0% by mass, stability of the ink of the present disclosure being ejected can be increased.

Examples of the water-soluble organic solvent include a glycol compound, a glycol ether compound, a lactam compound, a nitrogen-containing compound, an acetate compound, thiodiglycol, glycerin, and dimethyl sulfoxide.

Examples of the glycol compound include ethylene glycol, 1,3-propanediol, propylene glycol, 1,2-pentanediol, 1,5-pentanediol, 1,2-octanediol, 1,8-octanediol. 3-methyl-1,3-butanediol, 3-methyl-1,5-pentanediol, diethylene glycol, triethylene glycol, and tetraethylene glycol.

Examples of the glycol ether compound include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether.

Examples of the lactam compound include 2-pyrrolidone and N-methyl-2-pyrrolidone.

Examples of the nitrogen-containing compound include 1,3-dimethylimidazolidinone, formamide, and dimethyl formamide.

Examples of the acetate compound include diethylene glycol monoethyl ether acetate.

The water-soluble organic solvent is preferably glycerin, a glycol compound, or a glycol ether compound, and more preferably glycerin, 1,2-pentanediol, 3-methyl-1,5-pentanediol, 3-methyl-1,3-butanediol, or triethylene glycol monoethyl ether.

The percentage content of the water-soluble organic solvent in the ink of the present disclosure is preferably at least 5.0% by mass and no greater than 40.0% by mass, and more preferably at least 15.0% by mass and no greater than 30.0% by mass.

[Surfactant]

Preferably, the ink of the present disclosure further contains a surfactant. The surfactant increases permeability (wettability) of the ink of the present disclosure to a recording medium. Examples of the surfactant include an anionic surfactant, a cationic surfactant, and a nonionic surfactant. The surfactant is preferably a nonionic surfactant.

Examples of the nonionic surfactant include polyoxyethylene dodecyl ether, polyoxyethylene hexadecyl ether, polyoxyethylene nonylphenyl ether, polyoxyethylene solbitan monooleate ether, monodecanoyl sucrose, and ethylene oxide adduct of acetylene glycol. The nonionic surfactant is preferably ethylene oxide adduct of acetylene glycol.

In a case in which the ink of the present disclosure contains a surfactant, the percentage content of the surfactant in the ink of the present disclosure is preferably at least 0.05% by mass and no greater than 3.0% by mass, and more preferably at least 0.2% by mass and no greater than 1.0% by mass.

[Other Components]

The ink of the present disclosure may further contain any known additives (specific examples include a solution stabilizer, an anti-drying agent, an antioxidant, a viscosity modifier, a pH adjuster, and an antifungal agent) as necessary.

[Ink Production Method]

The ink of the present disclosure is produced by mixing a coloring particle dispersion containing the coloring particles and water, the water-soluble organic solvent, and a component (e.g., a surfactant) added as necessary using a stirrer, for example. The mixing time is 1 minute or longer and 30 minutes or shorter, for example. In production of the ink of the present disclosure, foreign matter and coarse particles may be removed using a filter (e.g., a filter with a pore diameter of 1 μm) after uniform mixing of each component.

EXAMPLES

Hereinafter, examples of the present disclosure will be described. However, the present disclosure is in no way limited to the following examples.

[Resin Synthesis]

A resin (R-1) being a methacrylic resin having a primary hydroxyl group, a resin (R-2) being a polyester resin having a primary hydroxyl group, a resin (R-3) being a urethane resin having a primary hydroxyl group, and a resin (r-4) being a methacrylic resin having no primary hydroxyl groups were synthesized by the following methods. The resins (R-1) to (R-3) each were the specific resin.

(Resin (R-1))

Into a reaction vessel equipped with a stirrer, a thermometer, and a reflux tube, 200 parts by mass of deionized water was added. Thereafter, 60 parts by mass of methyl methacrylate, 10 parts by mass of styrene, 5 parts by mass of 2-ethylhexyl acrylate, 15 parts by mass of 2-hydroxyethyl methacrylate, and 10 parts by mass of methacrylic acid were further added into the reaction vessel. Stirring of the contents of the reaction vessel was started then. Next, 0.5 parts by mass of azobisisobutyronitrile and 5 parts by mass of n-dodecyl mercaptan were further added into the reaction vessel. Next, the internal temperature of the reaction vessel was raised to 75° C., thereby causing a reaction of the contents of the reaction vessel. The reaction was allowed to proceed for 3 hours while the internal temperature (reaction temperature) of the reaction vessel was kept at 75 to 80° C. Next, the internal temperature of the reaction vessel was raised to 90° C. and kept at 90° C. for 1 hour. The reaction was terminated then. A reaction liquid as a result of the reaction was filtered using a sieve with an opening of 80 μm and the resultant filtrate was dried, thereby obtaining a methacrylic resin (resin (R-1)). The resin (R-1) had a hydroxyl value of 65 mgKOH/g.

(Resin (R-2))

Into a reaction vessel equipped with a stirrer, a heating and cooling device, a thermometer, a nitrogen inlet tube, and a pressure reducing device, 159 parts by mass of sebacic acid, 28 parts by mass of adipic acid, 124 parts by mass of 1,4-butanediol, and 1 part by mass of titanium dihydroxybis(triethanolaminate) being a condensation catalyst were added. The internal temperature of the reaction vessel was raised to 180° C. in a nitrogen atmosphere, and the contents of the reaction vessel were allowed to react at 180° C. for 8 hours. The reaction was allowed to proceed under distillation of water generated by the reaction. Next, the reaction vessel was gradually heated to raise the internal temperature of the reaction vessel to 220° C. Next, the contents of the reaction vessel were allowed to react at 220° C. for 4 hours in a nitrogen atmosphere. The reaction was allowed to proceed under distillation of water and 1,4-butanediol each generated by the reaction. Next, the internal pressure of the reaction vessel was reduced and the contents of the reaction vessel were allowed to further react at 220° C. while the internal pressure of the reaction vessel was kept within a range of 0.007 MPa to 0.026 MPa. The reaction was terminated at the time when the reaction product (resin (R-2)) had a Mw of 10,000. As a result, a polyester resin (resin (R-2)) being a reaction product was obtained. The resultant resin (R-2) had a hydroxyl value of 36 mgKOH/g.

(Resin (R-3))

Into a reaction vessel equipped with a stirrer, a heating and cooling device, a thermometer, a nitrogen inlet tube, and a pressure reducing device, 66 parts by mass of 1,4-butanediol, 86 parts by mass of 1,6-hexanediol, and 40 parts by mass of methyl ethyl ketone were added. Next, the contents of the reaction vessel were stirred, thereby yielding a uniform reaction liquid. Next, 248 parts by mass of hexamethylene diisocyanate was added to the reaction liquid and a reaction was caused at 80° C. for 5 hours. Through the above, a methyl ethyl ketone solution containing a urethane resin (resin (R-3)) was obtained. Thereafter, methyl ethyl ketone was distilled, thereby obtaining the urethane resin (resin (R-3)). The resultant resin (R-3) had a hydroxyl value of 36 mgKOH/g.

(Resin (r-4))

Into a reaction vessel equipped with a stirrer, a thermometer, and a reflux tube, 200 parts by mass of deionized water was added. Thereafter, 70 parts by mass of methyl methacrylate, 10 parts by mass of styrene, 5 parts by mass of 2-ethylhexyl acrylate, and 15 parts by mass of methacrylic acid were further added. Stirring of the contents of the reaction vessel was started then. Next, 0.5 parts by mass of azobisisobutyronitrile and 5 parts by mass of n-dodecyl mercaptan were further added into the reaction vessel. Next, the internal temperature of the reaction vessel was raised to 75° C., thereby causing a reaction of the contents of the reaction vessel. The reaction was allowed to proceed for 3 hours while the internal temperature (reaction temperature) of the reaction vessel was kept at 75 to 80° C. Next, the internal temperature of the reaction vessel was raised to 90° C. and kept at 90° C. for 1 hour. The reaction was terminated then. A reaction liquid as a result of the reaction was filtered using a sieve with an opening of 80 μm and the resultant filtrate was dried, thereby obtaining a methacrylic resin (resin (r-4)). The resin (r-4) had a hydroxyl value of 0 mgKOH/g.

[Coloring Particle Preparation]

Coloring particle dispersants each containing coloring particles were prepared by the following methods. First, details of reactive dyes used for the coloring particle preparation were described below.

Reactive dye (D-1): "Drimarene K Brilliant Blue BL", product of Sigma-Aldrich Corporation, reactive dye having a chlorotriazinyl group Reactive dye (D-2): "Drimarene K Scarlet", product of Sigma-Aldrich Corporation, reactive dye having a chlorotriazinyl group Reactive dye (D-3): "Drimarene K Yellow 3GL", product of Sigma-Aldrich Corporation, reactive dye having a chlorotriazinyl group Reactive dye (D-4): "Drimarene K Jet Black", product of Sigma-Aldrich Corporation, reactive dye having a chlorotriazinyl group Reactive dye (D-5): "SUMIFIX (registered Japanese trademark) Brill. Blue R Special Gran.", product of Sumika Chemtex Company, Limited, addition reactive dye (Coloring Particle Dispersion (S-1) Containing Coloring Particles (P-1))

Into a reaction vessel equipped with a stirrer, a thermometer, and a reflux tube, 500 parts by mass of dimethyl sulfoxide was added. Then, 15 parts by mass of the resin (R-1) was further added into the reaction vessel. Next, triethanolamine was dripped into the reaction vessel to adjust the pH of the contents of the reaction vessel to 10. Next, the internal temperature of the reaction vessel was raised to 100° C. Next, 5 parts by mass of the reactive dye (D-1) was added into the reaction vessel and a reaction of the contents of the reaction vessel was caused at 100° C. for 1 hour (the amount of the reactive dye used relative to 100 parts by mass of the resin was 33.3 parts by mass). Next, the reaction vessel was left to stand to reduce the internal temperature of the reaction vessel to room temperature. Thereafter, deionized water was added into the reaction vessel until sediment (a reaction product between the specific resin and the reactive dye) precipitated from the contents of the reaction vessel. Next, the contents of the reaction vessel were filtered using a sieve with an opening of 80 μm, and the resultant filtrate was washed with water and dried, thereby obtaining a reaction product.

Into a vessel equipped with a stirrer including a stirring vane, 20 parts by mass of the resultant reaction product and 50 parts by mass of methyl ethyl ketone were added. While the resultant solution was stirred at a speed of 450 rpm using the stirring vane, 80 parts by mass of water was dripped into the vessel. The dripping was performed at a speed of 10 mL/min. using a liquid feed pump ("PERISTA PUMP", product of ATTO CORPORATION). Through the above, coloring particles (P-1) were precipitated in the solution. After the dripping was terminated, the resultant solution was further stirred for 30 minutes using the stirring vane. Then, methyl ethyl ketone was distilled by depressurization using an evaporator. Through the above, a coloring particle dispersion (S-1) containing the coloring particles (P-1) was obtained.

(Coloring Particle Dispersions (S-2) to (S-9) and (s-10) Respectively Containing Coloring Particles (P-2) to (P-9) and (p-10))

Coloring particle dispersions (S-2) to (S-9) and (s-10) respectively containing coloring particles (P-2) to (P-9) and (p-10) were prepared according to the same method as that for preparing the coloring particle dispersion (S-1) containing the coloring particles (P-1) in all aspects other than that the resin and the reactive dye used were changed to those listed in Table 1.

(Resin Particle Dispersion (s-11) Containing Resin Particles)

A resin particle dispersion (s-11) containing resin particles was prepared as a material used for an ink of a comparative example.

Into a vessel equipped with a stirrer including a stirring vane, 20 parts by mass of the resin (R-1) and 50 parts by mass of methyl ethyl ketone were added. While the resultant solution was stirred at a speed of 450 rpm using the stirring vane, 80 parts by mass of water was dripped into the vessel. The dripping was performed at a speed of 10 mL/min. using a liquid feed pump ("PERISTA PUMP", product of ATTO CORPORATION). The dripping precipitated resin particles in the solution. After the dripping was terminated, the resultant solution was further stirred for 30 minutes using the stirring vane. Then, methyl ethyl ketone was distilled by depressurization using an evaporator. Through the above, a resin particle dispersion (s-11) containing the resin particles was obtained.

Table 1 below shows the volume median diameters $D_{50}$ of the coloring particles contained in the respective resultant coloring particle dispersions and the volume median diameter $D_{50}$ of the resin particles contained in the resin particle dispersion. In Table 1 below, "Parts by mass" under the column titled "Reactive dye" indicates the amount of a corresponding reactive dye used in terms of part by mass relative to 100 parts by mass of a corresponding resin.

Examples 2 to 10 and Comparative Examples 1 to 3

Inks of Examples 2 to 10 and Comparative Examples 1 to 3 were prepared according to the same method as that for preparing the ink of Example 1 in all aspects other than that the type and the amount of each component were changed to those shown in Tables 2 and 3 below. In Tables 2 and 3, "MBD" indicates 3-methyl-1,3-butanediol. Also, "PTD" indicates 1,2-pentanediol.

<Evaluation>

With respect to each of the inks of Examples 1 to 10 and Comparative Examples 1 to 3, color fastness to washing of a textile print formed with the ink and image density of an image formed with the ink were evaluated by the following methods. The evaluation results are shown in Tables 2 and 3 below.

[Evaluation Apparatus]

An inkjet recording apparatus (prototype evaluation apparatus produced by KYOCERA Document Solutions Inc.) was used as an evaluation apparatus. The evaluation apparatus included four line-type recording heads ("KJ4B-QA", product of KYOCERA Corporation). The four recording heads were arranged so that the longitudinal direction of each recording head was perpendicular to a conveyance direction of a recording medium. The recording heads were arranged at intervals of 20 mm. One of the recording heads

TABLE 1

| Dispersion | Particles | Resin Type | Type of resin | Primary hydroxyl group | Reactive dye Type | chlorotriazinyl group | Part by mass | $D_{50}$ [nm] |
|---|---|---|---|---|---|---|---|---|
| S-1 | P-1 | R-1 | Methacryl | Present | D-1 | Present | 33.3 | 89 |
| S-2 | P-2 | R-1 | Methacryl | Present | D-2 | Present | 33.3 | 91 |
| S-3 | P-3 | R-1 | Methacryl | Present | D-3 | Present | 33.3 | 85 |
| S-4 | P-4 | R-1 | Methacryl | Present | D-4 | Present | 33.3 | 101 |
| S-5 | P-5 | R-2 | polyester | Present | D-1 | Present | 33.3 | 105 |
| S-6 | P-6 | R-3 | Urethane | Present | D-1 | Present | 33.3 | 111 |
| S-7 | P-7 | R-1 | Methacryl | Absent | D-5 | Absent | 33.3 | 91 |
| S-8 | P-8 | R-1 | Methacryl | Present | D-1 | Present | 16.7 | 105 |
| S-9 | P-9 | R-1 | Methacryl | Present | D-1 | Present | 66.7 | 86 |
| s-10 | p-10 | r-4 | Methacryl | Absent | D-1 | Present | 33.3 | 103 |
| s-11 | Resin particles | R-1 | Methacryl | Present | — | — | — | 109 |

<Ink Preparation>

Example 1

Using a stirrer ("THREE-ONE MOTOR (registered Japanese trademark) BL-600", product of Shinto Scientific Co., Ltd.), 75.0 parts by mass of the coloring particle dispersion (S-1) containing the coloring particles (P-1), 0.5 parts by mass of a nonionic surfactant "SURFYNOL (registered Japanese trademark) 440", product of Nissin Chemical Industry Co., Ltd.), 4.0 parts by mass of glycerin, 12.0 parts by mass of 3-methyl-1,5-pentanediol (MPD), 6.0 parts by mass of triethylene glycol monobutyl ether (TGMB), and ion exchange water (IEW) were mixed, thereby yielding a mixed liquid. The amount (2.5 parts by mass) of the ion exchange water added was such that the total amount of the mixed liquid was 100.0 parts by mass. The resultant mixed liquid was filtered using a 1-μm filter ("Membrane-solutions", product of Membrane Solutions Limited, material: polytetrafluoroethylene (PTFE)). Through the above, an ink of Example 1 was obtained.

of the evaluation apparatus was filled with an evaluation target (any of the inks of Examples 1 to 10 and Comparative Examples 1 to 3).

[Color Fastness to Washing]

Using the evaluation apparatus, a solid image was formed on the entire surface of an textile printing target (Tetron pongee fabric made from polyester fibers) in an environment at a temperature of 25° C. and a relative humidity of 60%. In the solid image formation, the evaluation apparatus was set so that an amount of the ink ejected (volume per one drop of the ink) was 10.5 pL. Next, the textile printing target with the solid image formed thereon was heated at 180° C. for 60 seconds. This united the ink and the polyester fibers, thereby obtaining a textile print.

A color fastness test was performed on the textile print in accordance with the Japanese Industrial Standards L0844: 2011. In detail, an aqueous solution (soap concentration: 5 g/L) containing a soap ("SHABONDAMA POWDERED SOAP", product of SHABONDAMA SOAP Co., Ltd.) was prepared as a washing liquid. The textile print was washed with the washing liquid using a washing tester. Thereafter, the degree of discoloration of the textile print was evaluated in terms of grade using a gray scale for assessing discoloration defined in the Japanese Industrial Standards (JIS) L0804:2004. In detail, the degree of change in color of the textile print was rated in 9 grades of grade 1, grade 1-2, grade 2, grade 2-3, grade 3, grade 3-4, grade 4, grade 4-5, and grade 5. In the above rating, grade 1 indicates the largest degree of change in color while grade 5 indicates the smallest degree of change in color. The color fastness to washing was evaluated according to the following criteria.

(Criteria for Color Fastness to Washing)

A (very good): degree of change in color of grade 5
B (good): degree of change in color of grade 4 or 4-5
C (poor): degree of change in color of grade 1, 1-2, 2, 2-3, 3, or 3-4

[Image Density]

Using the evaluation apparatus, a solid image (printing rate 100%) with a size of 2.3 cm×11.5 cm was formed on a recording medium ("COLOR COPY (registered Japanese trademark)", product of Mondi plc, A4-size copy paper, basis weight 90 g/m$^2$). In the solid image formation, the evaluation apparatus was set so that the amount of the ink ejected (volume per one drop of the ink) was 11.5 pL. Next, the recording medium with the solid image formed thereon was left to stand for 24 hours in a normal-temperature and normal-humidity environment (temperature 25° C., relative humidity 60%). Next, the image density of the solid image was measured using a portable reflection densitometer ("FD-5", product of KONICA MINOLTA JAPAN, INC.). In the image density measurement, an image density was measured at each of 3 locations randomly selected in the solid image and an average value of the image densities measured at the 3 locations was taken to be an evaluation value. The measurement conditions set included a light source for observation of $D_{50}$, an illumination of M2, a viewing angle of 2 degrees, and a density status of I. The image density was evaluated according to the following criteria.

(Criteria for Image Density)

Cyan ink (Examples 1 and 5 to 10 and Comparative Examples 1 to 3): good (A) if evaluation value was at least 0.93 and poor (B) if evaluation value was less than 0.93

Magenta ink (Example 2): good (A) if evaluation value was at least 0.87 and poor (B) if evaluation value was less than 0.87

Yellow ink (Example 3): good (A) if evaluation value was at least 1.08 and poor (B) if evaluation value was less than 1.08

Black ink (Example 4): good (A) if evaluation value was at least 1.10 and poor (B) if evaluation value was less than 1.10

TABLE 2

| | | | Example | | | | | | |
|---|---|---|---|---|---|---|---|---|---|
| | | | 1 | 2 | 3 | 4 | 5 | 6 | 7 |
| Composition | Coloring particle dispersion | Type | S-1 | S-2 | S-3 | S-4 | S-5 | S-6 | S-7 |
| | | Part by mass | 75.0 | 75.0 | 75.0 | 75.0 | 75.0 | 75.0 | 75.0 |
| | Reactive dye | Part by mass | — | — | — | — | — | — | — |
| | Resin particle dispersion (s-11) | Part by mass | — | — | — | — | — | — | — |
| | Surfactant | Part by mass | 0.5 | 0.5 | 0.5 | 0.5 | 0.5 | 0.5 | 0.5 |
| | Glycerin | Part by mass | 4.0 | 4.0 | 4.0 | 4.0 | 4.0 | 4.0 | 4.0 |
| | MPD | Part by mass | 12.0 | 12.0 | 12.0 | 12.0 | 12.0 | 12.0 | 12.0 |
| | MBD | Part by mass | — | — | — | — | — | — | — |
| | TGMB | Part by mass | 6.0 | 6.0 | 6.0 | 6.0 | 6.0 | 6.0 | 6.0 |
| | PTD | Part by mass | — | — | — | — | — | — | — |
| | IEW | Part by mass | Rest | Rest | Rest | Rest | Rest | Rest | Rest |
| | Total | Part by mass | 100.0 | 100.0 | 100.0 | 100.0 | 100.0 | 100.0 | 100.0 |
| Evaluation | Image density | Evaluation value | 1.03 | 0.95 | 1.17 | 1.13 | 1.00 | 0.97 | 1.04 |
| | | Rating | A | A | A | A | A | A | A |
| | Color fastness to washing | Grade | 4 | 4 | 4 | 4 | 4.5 | 5 | 4 |
| | | Rating | B | B | B | B | B | A | B |

TABLE 3

| | | | Example | | | Comparative Example | | |
|---|---|---|---|---|---|---|---|---|
| | | | 8 | 9 | 10 | 1 | 2 | 3 |
| Composition | Coloring particle dispersion | Type | S-8 | S-9 | S-1 | — | — | s-10 |
| | | Part by mass | 75.0 | 75.0 | 75.0 | — | — | 75.0 |
| | Reactive dye | Part by mass | — | — | — | 5.0 | 5.0 | — |
| | Resin particle dispersion (s-11) | Part by mass | — | — | — | — | 71.0 | — |
| | Surfactant | Part by mass | 0.5 | 0.5 | 0.5 | 0.5 | 0.5 | 0.5 |
| | Glycerin | Part by mass | 4.0 | 4.0 | 4.0 | 4.0 | 4.0 | 4.0 |
| | MPD | Part by mass | 12.0 | 12.0 | — | 12.0 | 12.0 | 12.0 |
| | MBD | Part by mass | — | — | 14.0 | — | — | — |

TABLE 3-continued

|  |  |  | Example | | | Comparative Example | | |
| --- | --- | --- | --- | --- | --- | --- | --- | --- |
|  |  |  | 8 | 9 | 10 | 1 | 2 | 3 |
|  | TGMB | Part by mass | 6.0 | 6.0 | — | 6.0 | 6.0 | 6.0 |
|  | PTD | Part by mass | — | — | 4.0 | — | — | — |
|  | IEW | Part by mass | Rest | Rest | Rest | Rest | Rest | Rest |
|  | Total | Part by mass | 100.0 | 100.0 | 100.0 | 100.0 | 100.0 | 100.0 |
| Evaluation | Image density | Evaluation value | 0.96 | 1.05 | 1.05 | 1.06 | 1.03 | 0.65 |
|  |  | Rating | A | A | A | A | A | B |
|  | Color fastness to washing | Grade | 5 | 4 | 4 | 1 | 1 | 1.5 |
|  |  | Rating | A | B | B | C | C | C |

As shown in Tables 2 and 3, the inks of Examples 1 to 10 each contained coloring particles and an aqueous medium. The coloring particles contained a reaction product between a reactive dye and a specific resin having a primary hydroxyl group. With any of the inks of Examples 1 to 10, an image with a desired image density was formed and a textile print with excellent color fastness to washing was formed.

A textile print with excellent color fastness to washing was not formed with the ink of Comparative Example 1 due to the ink not having the above features. In detail, the ink of Comparative Example 1 contained a reactive dye itself rather than coloring particles containing a reaction product between the reactive dye and a specific resin. A textile print formed with the ink of Comparative Example 1 had insufficient color fastness to washing due to the reactive dye being readily eluted out into water.

The ink of Comparative Example 2 contained separately a reactive dye and a specific resin instead of coloring particles containing a reaction product between the reactive dye and the specific resin. A textile print formed with the ink of Comparative Example 2 had insufficient color fastness to washing due to the reactive dye being readily eluted out into water.

The coloring particles contained in the ink of Comparative Example 3 contained a reaction product between a reactive dye and a resin having no primary hydroxyl groups. It is determined that in the ink of Comparative Example 3, the reactive dye was contained in the ink in a single state (free state) without reacting with (being chemically bonded to) the resin. As such, an image formed with the ink of Comparative Example 3 was insufficient in image density because the reactive dye permeated into the recording medium together with the aqueous medium and did not stay on the surface of the recording medium. Also, a textile print formed with the ink of Comparative Example 3 was insufficient in color fastness to washing because the reactive dye and the resin each were only attached to the textile printing target.

What is claimed is:

1. An inkjet ink comprising:
coloring particles; and
an aqueous medium, wherein
the coloring particles contain a reaction product between a reactive dye and a resin having a primary hydroxyl group, and
the coloring particles have a volume median diameter D50 of at least 40 nm and no greater than 150 nm.

2. The inkjet ink according to claim 1, wherein
the reactive dye has a chlorotriazinyl group.

3. The inkjet ink according to claim 1, wherein
the resin includes a styrene-(meth)acrylic resin, a polyester resin, or a urethane resin.

4. The inkjet ink according to claim 1, wherein
a percentage content of the coloring particles is at least 3.0% by mass and no greater than 20.0% by mass.

5. The inkjet ink according to claim 1, wherein
in the coloring particles, a percentage content of a component derived from the reactive dye is at least 10 parts by mass and no greater than 90 parts by mass relative to 100 parts by mass of a component derived from the resin.

6. The inkjet ink according to claim 1 that is used for textile-printing a textile printing target.

7. The inkjet ink according to claim 6, wherein
the textile printing target is a polyester fabric.

8. An inkjet ink comprising:
coloring particles; and
an aqueous medium, wherein
the coloring particles contain a reaction product between a reactive dye and a resin having a primary hydroxyl group, and
wherein in the coloring particles, a percentage content of a component derived from the reactive dye is at least 10 parts by mass and no greater than 90 parts by mass relative to 100 parts by mass of a component derived from the resin.

9. The inkjet ink according to claim 8, wherein
the reactive dye has a chlorotriazinyl group.

10. The inkjet ink according to claim 8, wherein
the resin includes a styrene-(meth)acrylic resin, a polyester resin, or a urethane resin.

11. The inkjet ink according to claim 8, wherein
a percentage content of the coloring particles is at least 3.0% by mass and no greater than 20.0% by mass.

12. The inkjet ink according to claim 8, wherein
the coloring particles have a volume median diameter D50 of at least 80 nm and no greater than 120 nm.

13. The inkjet ink according to claim 8 that is used for textile-printing a textile printing target.

14. The inkjet ink according to claim 13, wherein
the textile printing target is a polyester fabric.

* * * * *